Feb. 1, 1949.    H. E. PALAITH    2,460,765
REFRIGERATING MEANS FOR CONTAINERS
Filed Oct. 29, 1945
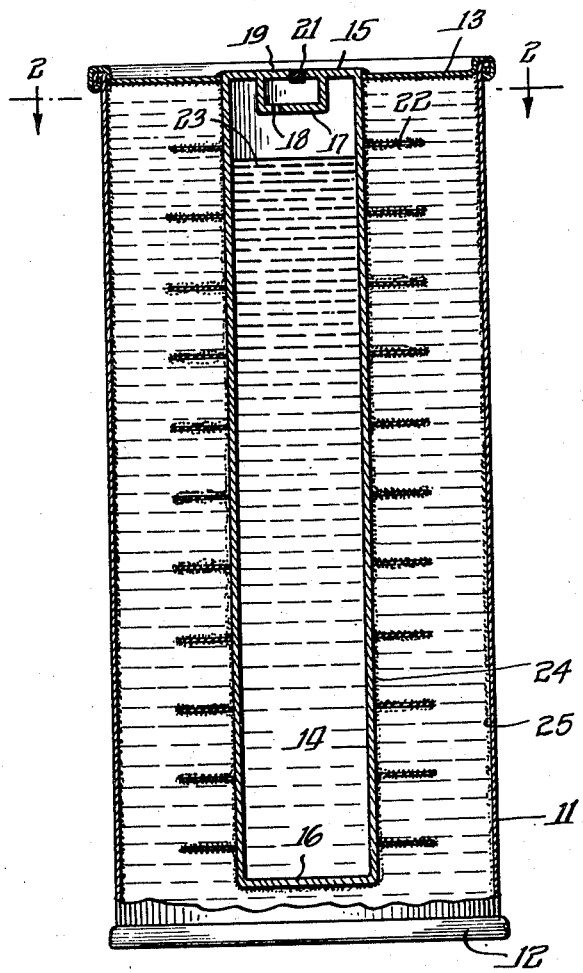
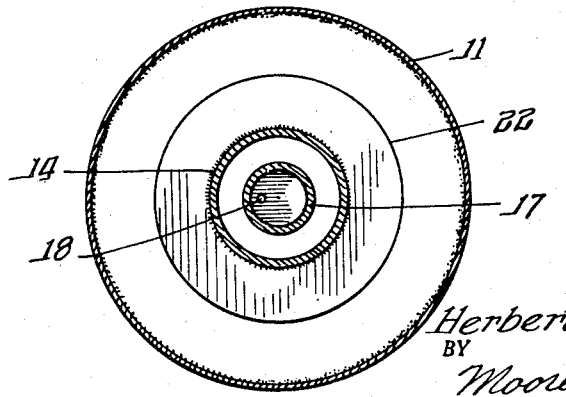
INVENTOR.
Herbert E. Palaith
BY Moore, Olson & Trexler
Attys.

Patented Feb. 1, 1949

2,460,765

UNITED STATES PATENT OFFICE 2,460,765

REFRIGERATING MEANS FOR CONTAINERS

Herbert E. Palaith, Evanston, Ill.

Application October 29, 1945, Serial No. 625,341

7 Claims. (Cl. 62—92)

The present invention relates to a refrigeratory container and more particularly to a container for food or beverage having integrally formed therein means for refrigerating or cooling the contents of the container before use, so that a marketable package containing the food in one compartment and a normally inactive refrigerant in another is provided.

Certain foods and beverages are to be cooled before serving. In packaging foods or beverages it would be desirable to provide a package with an integral refrigerating or cooling element whereby the food or beverage would be cooled the proper amount before serving. Such an arrangement would be particularly desirable for outings such as picnics and camping and also for use where refrigerators are not conveniently available or where it is desired to chill or cool a beverage or food just the desired amount without the necessity of carefully avoiding excess cooling or chilling.

In accordance with the present invention it is contemplated to provide a food or beverage container with an integral cooler of a design which can be manufactured cheaply in mass production. In providing a container with an integral refrigerating element it is necessary to provide a relatively simple means for initiating the operation of cooling which will not require any special tools or skilled manipulation. It furthermore is desirable to provide a control of the rate at which the cooling or refrigerating action takes place. This may be accomplished in accordance with the present invention by providing a food or beverage container having a reentrant container in which a refrigerant is confined. The reentrant portion of the container containing the refrigerant is normally sealed until shortly before the food or beverage is to be served. A suitable seal is provided which may be readily broken by simple manipulation as by the use of a knife or ice pick. Thereafter the refrigerant will be permitted to escape to the atmosphere at a rate which properly controls the cooling action.

In a container of the kind constructed in accordance with the present invention a refrigerant under pressure is contained in the inner compartment. Such refrigerant preferably is of the type which when permitted to escape to the atmosphere will have a boiling point lower than the temperature of the product to be cooled. In order that the refrigerant obtain substantially all of its heat from the food or beverage which is to be cooled, it is advisable to surround the compartment as completely as possible with the product. The refrigerant is permitted to be released in the form of a vapor into the atmosphere through an orifice of predetermined diameter so that the product will be lowered in temperature an amount dependent upon the quantity of refrigerant originally stored in the refrigerant compartment.

It therefore is an object of the present invention to provide a container having an integral refrigeration compartment which can be activated at a desired time to cool the product within the container.

It is a further object of the present invention to provide a unitary package having a product container for food or beverage and a refrigeration compartment which is relatively simple and economical to manufacture.

A still further object of the present invention is to provide a self-contained package having a food or beverage compartment and a refrigeration compartment wherein the refrigeration compartment may be activated by the breaking of a seal, and wherein the rate of refrigeration is predetermined.

Other and further objects of the present invention subsequently will become apparent from the following description taken in connection with the accompanying drawing wherein Figure 1 is a cross sectional view of one embodiment of the present invention; and Figure 2 is a transverse cross sectional view of the device shown in Figure 1 as seen in the direction of the arrows along the line 2—2.

For the purpose of illustrating the application of the present invention, the drawing shows a container which is particularly adapted for beverages. While in order to illustrate the present invention such application has been selected for showing in the drawing, it is to be understood that the invention is equally applicable to other embodiments with such modifications as are required, for example where the invention is to be applied for use in cooling food products. In the drawing there is shown an outer container 11 which preferably is cylindrical in shape and which has a bottom 12 and a top 13. Concentrically arranged to the outer cylinder 11 is an inner cylindrical container 14 which has one end 15 in substantially the same plane as the end 13 of the outer container. The inner container 14 has a closed end 16. The end 15 may be formed with a reentrant cup portion 17 having in one of its walls an aperture 18 of a predetermined size. The reentrant cup portion 17 may be closed by a suitable seal 19 which may be provided with a puncturable portion 21. This puncturable portion 21 may be of somewhat thicker but softer metal so that a knife or ice pick may be used to puncture the material 21 to form an aperture. Obviously such aperture will naturally be of varying size dependent upon the tool used but the difference in apertures thus produced by the user of the container will have no effect upon the cooling rate of the refrigerant which is stored within the inner cylinder 14. In the case of certain products such as beverages it may be desirable to provide the exterior of the inner cylinder 14 with cooling fins 22 although such fins are not an indispensable part of the invention. It is also desirable that a protective coating of tin or the like such as is commonly used in the canning industry should be applied to the outer surface 24 of the inner container and to the inner surface 25 of the outer container and to the inside surfaces of both ends.

The inner compartment 14 must be made of a material of sufficient thickness to withstand the vapor pressure of the refrigerant 23, and must also be able to withstand any corrosive action of the refrigerant. If for example the refrigerant 23 is ammonia, the puncturing of the soft seal 21 will permit an escape of ammonia vapor into the atmosphere through the aperture 18 at a controlled rate. Evaporation of the ammonia will require the heat transfer from the product surrounding the inner compartment 14. It is readily appreciated that a container such as illustrated may be constructed by mass production methods in an economical manner. The convenience of a container having an integral refrigeration compartment will be readily appreciated by the consuming public especially for certain foods and beverages which are to be cooled before serving. When no further vapor is escaping through the punctured seal opening 21, the product contained within the outer cylinder 11 will have been cooled sufficiently for serving. Where the container 11 contains a food product or a beverage, a conventional can opener may be employed by inverting the can and opening the end 12.

While for the purpose of illustrating and describing the present invention a certain embodiment has been shown in the drawing, it is to be understood that such showing is not to be construed as a limitation since such variations in the designs of the unit are contemplated as are commensurate with the spirit and scope of the invention set forth in the following claims.

This invention is hereby claimed as follows:

1. A food or beverage container comprising means forming a compartment for the food or beverage, a cover for said compartment, and a second compartment united to the cover of the first compartment for receiving an expansible refrigerant adapted to absorb heat from the food or beverage in the first compartment on venting of the second compartment to atmosphere, and closure means for said second compartment and readily operable to open said second compartment to atmosphere to initiate the refrigerating action of said refrigerant and means in said second compartment providing an orifice of predetermined size to control the rate of expansion of the refrigerant in the second compartment on opening the said closure means to prevent quick freezing of the food or beverage to the wall surface of the second compartment.

2. A food or beverage container comprising means forming a compartment for the food or beverage and a second compartment integral with the first compartment for receiving an expansible refrigerant adapted on expansion to absorb heat from the food or beverage in the first compartment, means providing an orifice of predetermined size for venting said second compartment to permit expansion of said refrigerant at a predetermined rate, and closure means normally preventing venting of said second compartment through said orifice but operable on opening of said closure means to permit venting of said second compartment through said orifice.

3. A unitary package for the distribution of food or beverage comprising a sealed outer metal container for food or beverage, an inner metal container for an evaporable refrigerant under pressure, said inner container having a reentrant end portion provided with an aperture of a predetermined size to permit the escape of refrigerant vapor at a predetermined rate, and a cover for said reentrant portion having a puncturable seal adapted on puncturing thereof to permit the refrigerant vapor to escape to the atmosphere through said aperture.

4. A unitary package for food or beverage providing automatic cooling of the food or beverage when needed comprising a sealed outer container for food or beverage which is to be cooled, an inner metal container for a refrigerant under pressure which at atmospheric pressure becomes a gas, said inner container having a reentrant end portion provided with an aperture to permit escape of the refrigerant gas at a predetermined rate, a cover for said reentrant portion including a soft metal sealing member adapted to be punctured by a sharp implement to initiate the cooling operation.

5. A unitary package comprising a sealed metal outer container for material to be cooled, an inner metal container having therein a refrigerant under pressure which at atmospheric pressure becomes a gas, said inner container being provided with an orifice of predetermined size for controlling the rate at which the refrigerant may escape to the atmosphere, and a cover for said inner container having puncturable means adapted to be punctured by an implement to initiate the refrigerating or cooling action.

6. A refrigerating container comprising a sealed cylindrical chamber of relatively thin metal having therein material to be cooled, an inner concentric cylindrical chamber of substantially thicker metal having therein under superatmospheric pressure a refrigerant which at atmospheric pressure becomes a gas, said chambers having an end member in a substantially common plane, said inner chamber having a wall member inwardly of said end member and said wall member having an aperture of predetermined size to regulate the rate of escape of refrigerant therefrom, and a puncturable seal in said end member over said inner chamber, the outer surface of said inner chamber and the inner surface of said outer chamber being provided with a protective coating.

7. A unitary food or beverage container comprising a cylindrical can of relatively thin metal receiving therein a food or beverage, said can being sealed at its opposite ends, a second cylindrical container concentric with said can and of substantially thicker metal, said container being sealed at its opposite ends and united to one end of said can, said second container having therein under super-atmospheric pressure a liquid refrigerant which at atmospheric pressure becomes a gas, said second container having a transverse wall portion inwardly at one end thereof and said transverse wall having an orifice therein of predetermined size for regulating the rate of expansion and conversion of said refrigerant into a gas whereby to control the rate of refrigeration of the food or beverage in the can when the second container is open to the atmosphere, and metal fins secured in heat conducting relation to the outer wall of the second container and projecting laterally therefrom and spaced longitudinally of the second container.

HERBERT E. PALAITH.

REFERENCES CITED

The following references are of record in the file of this patent:

UNITED STATES PATENTS

| Number | Name | Date |
|---|---|---|
| 1,897,723 | Free | Feb. 14, 1933 |
| 1,971,364 | Zimmer | Aug. 28, 1934 |
| 2,289,008 | Gessler | July 7, 1942 |